US010065652B2

(12) United States Patent
Shenoy et al.

(10) Patent No.: US 10,065,652 B2
(45) Date of Patent: Sep. 4, 2018

(54) METHOD AND SYSTEM FOR DRIVER MONITORING BY FUSING CONTEXTUAL DATA WITH EVENT DATA TO DETERMINE CONTEXT AS CAUSE OF EVENT

(71) Applicant: Lightmetrics Technologies Pvt. Ltd., Bangalore (IN)

(72) Inventors: Ravi Shenoy, Bangalore (IN); Krishna A G, Bangalore (IN); Gururaj Putraya, Bangalore (IN); Soumik Ukil, Bangalore (IN); Mithun Uliyar, Bangalore (IN); Pushkar Patwardhan, Bangalore (IN)

(73) Assignee: Lightmetrics Technologies PVT. LTD., Bangalore (IN)

( * ) Notice: Subject to any disclaimer, the term of this patent is extended or adjusted under 35 U.S.C. 154(b) by 0 days.

(21) Appl. No.: 15/526,839

(22) PCT Filed: Mar. 26, 2016

(86) PCT No.: PCT/IB2016/051733
§ 371 (c)(1),
(2) Date: May 15, 2017

(87) PCT Pub. No.: WO2016/151554
PCT Pub. Date: Sep. 29, 2016

(65) Prior Publication Data
US 2018/0001899 A1 Jan. 4, 2018

(30) Foreign Application Priority Data

Mar. 26, 2015 (IN) ............................ 1564/CHE/2015

(51) Int. Cl.
*B60Q 1/00* (2006.01)
*B60W 40/09* (2012.01)
(Continued)

(52) U.S. Cl.
CPC ............ *B60W 40/09* (2013.01); *B60W 40/08* (2013.01); *G07C 5/0808* (2013.01); *G07C 5/0816* (2013.01)

(58) Field of Classification Search
CPC ..... B60W 40/09; B60W 40/08; G07C 5/0808; G07C 5/0816
(Continued)

(56) References Cited

U.S. PATENT DOCUMENTS 7,932,820 B2 * 4/2011 Hurwitz ............... A42B 3/0453
340/432
9,298,575 B2 * 3/2016 Tamari ................ G06F 11/3013
(Continued)

*Primary Examiner* — John A Tweel, Jr.
(74) *Attorney, Agent, or Firm* — North Shore Patents, P.C.; Michele Liu Baillie

(57) ABSTRACT

A method and system for driver monitoring by fusing contextual data with event data to determine context as cause of event is provided. The method includes detecting an event from event data received from one or more inertial sensors associated with a vehicle of a driver or with the driver. The method also includes determining a context from an audio or video feed received from one or more devices associated with the vehicle or the driver. Further, the method includes fusing the event with the context to determine the context as a cause of the event. In addition, the method includes assigning a score to a driver performance metric based at least on the context and the event.

20 Claims, 12 Drawing Sheets

(51) Int. Cl.
*G07C 5/08* (2006.01)
*B60W 40/08* (2012.01)

(58) Field of Classification Search
USPC .......................................................... 340/439
See application file for complete search history.

(56) References Cited

U.S. PATENT DOCUMENTS

| | | | | |
|---|---|---|---|---|
| 2009/0021365 A1* | 1/2009 | Hurwitz | ............... | B60Q 1/2676 340/479 |
| 2013/0096731 A1* | 4/2013 | Tamari | .................... | G07C 5/085 701/1 |
| 2015/0057836 A1* | 2/2015 | Plante | .................... | G07C 5/085 701/1 |

* cited by examiner

US 10,065,652 B2

METHOD AND SYSTEM FOR DRIVER MONITORING BY FUSING CONTEXTUAL DATA WITH EVENT DATA TO DETERMINE CONTEXT AS CAUSE OF EVENT

TECHNICAL FIELD

The present disclosure relates to a method and a system for driver monitoring and, more particularly, to a method and a system for driver monitoring by fusing contextual data with event data to determine context as a cause of event.

BACKGROUND

Conventional telematics deals with mostly vehicle data and measure key performance indicators (KPIs) for driver monitoring based on the vehicle data. The measurement of KPIs based on inertial sensors, by itself or in conjunction with data obtained from onboard diagnostic (OBD) sensors, results in metrics that are inward-looking. However, a broader context in which such metrics are measured is not captured. Consider a case where a driver brakes suddenly. Data from the inertial sensors and the OBD sensors provide sufficient information to determine such events. However, the data from these sensors alone is insufficient to infer the reason for such an action. For example, it is impossible to determine whether the braking was a consequence of following a car very closely (tailgating) or if it was because an animal jumped in front of the car.

Further, in addition to basic location information, existing location technologies also provides traffic information. However, computation of time required to reach the destination overlooks factors that are dynamic in nature, for example nature of vehicular traffic (predominantly heavy trucks or cars), speed breakers, traffic lights, and the like. Up-to-date information on speed limits and the like are not always available. There are some applications that use inertial sensor data to infer road conditions and provide that information on maps. However, they do not provide detailed information such as type of vehicles that ply on the road, how orderly the traffic is and the like.

Therefore, there is a need for a method and a system for driver monitoring by fusing contextual data with event data to determine context as a cause of event.

SUMMARY

Various methods, apparatuses and computer readable mediums for driver monitoring by fusing contextual data with event data to determine context as cause of event is provided. The method includes detecting an event from event data received from one or more inertial sensors associated with a vehicle of a driver or with the driver. The method also includes determining a context from an audio or a video feed received from one or more devices associated with the vehicle or the driver. Further, the method includes fusing the event with the context to determine the context as a cause of the event. In addition, the method includes assigning a score to a driver performance metric based at least on the context and the event.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
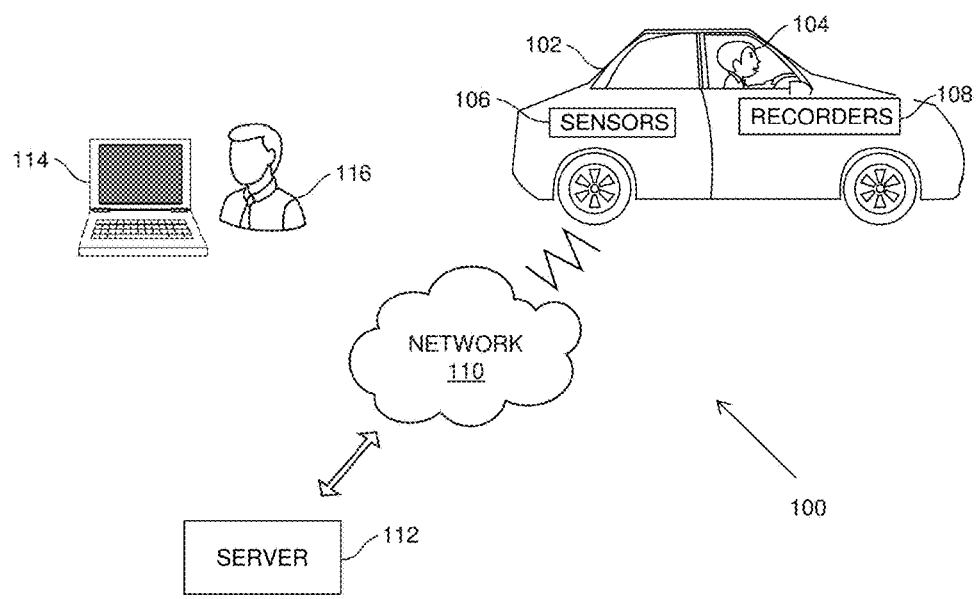
FIG. 1 illustrates an example representation of an environment, where various embodiments of the present disclosure may be practiced.

FIG. 1 shows an example representation of an environment 100, where one or more embodiments of the present disclosure can be implemented.

The environment 100 includes a driver 104 driving a vehicle 102. Examples of the vehicle 102 may include any vehicle that can ply on the road. The vehicle 102 is equipped with one or more sensors 106 (hereinafter referred to as the sensors 106) and one or more video or audio recorders 108 (hereinafter referred to as the recorders 108). Examples of the sensors 106 include, but are not limited to, inertial sensors, on-board diagnostic sensors (OBD), and location data sensors. Examples of the recorders 108 include, but are not limited to, a dashboard camera, a smartphone camera, an advance driver assistance system (ADAS) camera and the like. The sensors 106 and the recorders 108 are placed at or attached to various parts of the vehicle 102 to enable capturing of data from various parts of the vehicle 102. The captured data is either locally analyzed or sent to a server 112 via a network 110. The captured data includes contextual data, i.e. audio or visual data, and event data, i.e. data from the sensors 106. The server 112 processes the captured data either completely or partially [other part being already processed locally] to fuse the contextual data with event data to determine context as a cause of an event. The server 112 also assigns score to a driver performance metric based at least on the context and the event. The driver performance metric can be accessed by a fleet manager 116 via a device 114 such as any computing device. The device 114 is connected to the network 110 to provide the driver performance metric to various entities, for example fleet operators, for various drivers. The data analysis, it has to be noted can either be performed in real time locally or it can be done in the server 112 as shown. The driver performance metric can be provided as an online service, or as an application. Typical users of such an application or service include entities having a fleet of drivers or vehicles.

Figure 2:
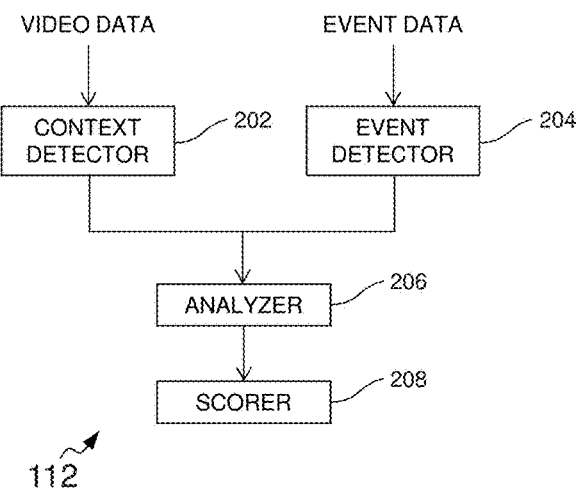
FIG. 2 illustrates a server, in accordance with an example embodiment of the present disclosure.

FIG. 2 illustrates a server, such as the server 112, in accordance with an example embodiment of the present disclosure.

The server 112 includes a context detector 202 and an event detector 204. The context detector 202 receives the audio or the video data, i.e. contextual data, and processes the audio or the video data to determine a context. The event detector 204 receives the event data and processes the event data to determine an event.

The server 112 could have a complete context detector 202 or event detector 204 which is not dependent on the data being processed locally in the vehicle 102. It could have a partial context detector 202 or event detector 204 where in the data is partially processes locally in the vehicle 102 and the processed data is further processed by the context detector 202 or event detector 204 in the server 112.

Examples of the event include, but are not limited to, hard braking, lane change, hard acceleration, cornering, distraction of the driver 104, and non-compliance in driving. In some example embodiments, the event is defined as an action that occurred as a result of an activity performed by the driver 104.

Examples of the context include, but are not limited to, the driver 104 of the vehicle 102 was driving improperly, the driver 104 of the vehicle 102 was driving properly but a driver of nearby vehicle applied sudden brake, the driver 104 of the vehicle 102 spotted a traffic signal or a speed breaker sign or a stop sign, object coming in unforeseen circumstances in front, the driver 104 accelerating to avoid an accident due to an unforeseen object or circumstances, the driver 104 overtaking, the driver 104 joining a main lane from a side lane, the driver 104 heard a vehicle honking, the driver 104 driving in a zigzag manner, the driver 104 swerving or cornering to avoid an accident due to an unforeseen object or circumstances, chat with a passenger, drowsiness of the driver 104, usage of mobile phone by the driver 104, any unexpected or unforeseen sounds coming from within the vehicle 102 or outside the vehicle 102, and distraction of the driver 104. In some embodiments, the context is defined as a reason or cause that resulted in the event, i.e. causing the driver 104 to do the activity.

The server 112 also includes an analyzer 206 to fuse the contextual data and the event data to determine the context as a cause of the event. For example, for in the event of hard braking, the server 112 analyzes the video to determine tailgating, i.e. the driver 104 of the vehicle 102 was driving improperly, as the cause.

In some embodiments, each video frame is analyzed to see if any object or event from a driving and traffic viewpoint is detected. Object detection is an important functionality of the server 112 (or more specifically, the context detector 202) and the server 112 is trained to detect objects using various techniques. One example includes collecting a large sample set of the object of interest for training purposes. Any one or more of the features such as, wavelets, scale invariant feature transform (SIFT), histogram of oriented gradients, local binary patterns, steerable filters, Gabor filters and the like is used for describing image data (frame data of a video). The features are learnt, instead of being hand crafted as in the state-of-the-art deep learning approaches. Any state of the art machine learning algorithm is used to train the context detector 202. Examples of machine learning algorithms include algorithms related to, but are not limited to, support vector machines, adaboost, decision trees, convolutional neural nets and the like. A generative or a discriminative model is trained. For example, a generative model is trained using only positive samples and this is used to compute the likelihood or probability of a given image patch including the object of interest. An additional logic is also present to infer the presence of an object given the likelihoods. Alternately, a set of negative examples are defined, and a discriminative training is done. Examples of generative models include, but are not limited to, Gaussian Mixture Models, AutoEncoders and the like. Examples of discriminative models include, but are not limited to support vector machines, adaboost and the like. An object can be animate or inanimate, for example the object can be a person, an animal, a falling rock, a tree that falls and the like. In general, any object that can be visually recognized and which is not meant to be on the road, and if it appears on the road in an unforeseen circumstance is included as the object.

Similarly, the event detector 204 can also be trained to detect an event from the event data, i.e. data from the sensors 106. The data using which the event detector 204 is trained differs from data used for training the context detector 202. Some of machine learning and other algorithms as used by the context detector 202 can be used by the event detector 204 to detect the event.

The analyzer 206 then correlates the context with the event to determine the context as cause of the event. As correlation progresses, a mapping is created between the event and likely contexts to help determine the relation between the event and the context in an expedited manner in future.

Based at least on the context and the event, i.e. the relationship between the context and the event, a score is provided to the driver performance metric by a scorer 208. The driver performance metric is an N-dimensional metric indicating performance of the driver 104 across various parameters. The scoring can be performed in various manners and few have been described in details below. For example, separate scores can be computed for the event and for the context, and then merged or correlated to obtain overall score.

In one embodiment, the score computation can be done based on heuristic rules or machine learning. Heuristic rules can be of the following form (with no loss of generality):

Instantaneous score s[n]=f(p, m), where n=time instant, p=prescribed value, m=measured value and f(p, m) is a function of p and m.

One non-limiting example for f(p, m)=1−exp(|p−m|/sigma) where sigma=constant. This ensures that s[n] is bounded between 0 and 1.

Table 1 illustrates the event, criteria and example scoring.

In some example embodiments, subjective ratings are also simultaneously obtained from experts (driving instructors or coaches, etc.) or officials from department of motor vehicles, regional transport office and the like during the training phase. A mathematical model is built to map the events detected in the captured data to the subjective scores using learning principles. The scoring model based on subjective rating is then applied to the events detected from the captured data.

In some example embodiments, the scoring for the events is done based on the magnitude of the gravitational forces felt at that instant on the occupants or contents of the vehicle 102. 1G which is 9.8 m/s2 can be taken as a reference. The gravitational forces are determined using the sensors 106 or specific devices installed for this purpose in the vehicle 102. An example for computing the score for inertial sensor events could be as follows:

$$si[n]=\max(0,1-|a|/\text{const}*g),$$

where si[n]=instantaneous score from inertial sensors, a=magnitude of acceleration (either magnitude of ax, ay and az from accelerometer, or just the relevant direction magnitude, for example ay, the horizontal direction acceleration for cornering), g=acceleration due to gravity, const=constant term, can be set to 2. This means that if the acceleration due to vehicle motion becomes 2 g or more, the driver 104 gets a score of 0. The constant can be set as required. For example, humans can tolerate more g-force (gravitational force) in the direction of motion than in the up-down direction. Therefore, for the z-axis (assuming that is the up-down direction), the tolerance limit in the form of the constant can be set to be lower. The score si[n] is computed from inertial sensors. It has to be noted that if the device is not oriented correctly, the inertial sensors are mapped from the local coordinate system to global coordinate system as known in the art.

The overall score is a function of the inertial sensor score, i.e. the score from the sensors 106 and a score from another modality such as the contextual data or the video or the audio data, or the context. In an example embodiment, the

TABLE 1

| Event | Criteria | Example Scoring |
|---|---|---|
| Tailgating | p = braking distance<br>m = distance to vehicle | p = 10 m, m = 12 m, s[n] = 1, as tailgate distance is greater than prescribed value.<br>p = 10 m, m = 8 m, s[n] = 0.1353 (assuming sigma = 1).<br>p = 10 m, m = 4 m, s[n] = 0.0025 (assuming sigma = 1). |
| Speed | p = posted limit<br>m = measured speed of vehicle | p = 80 kmph, m = 70 kmph, s[n] = 1, as the speed is below the prescribed speed.<br>p = 80 kmph, m = 90 kmph, s[n] = 0.3678 (assuming sigma = 10).<br>p = 80 kmph, m = 120 kmph, s[n] = 0.0183 (assuming sigma = 10). |
| Stop | Rolling stop or full stop | s[n] = 1 if full stop, s[n] = 0 if rolling stop |
| No overtaking | Overtaking in a no-overtaking zone | s[n] = 0 if over taking happens in a no-overtaking zone |
| One way | Moving in wrong direction | s[n] = 0 if wrong entry is done |
| School zone | Offences in school zone can be penalized higher | s[n] = s[n]/a where a > 1, i.e. the score for any offense is penalized more. If already 0 and school zone, an alert can be raised |
| Traffic lights | Moved on Amber or Red | s[n] = 0 if vehicle moved on amber/red |
| Dangerous lane change | Cut a solid lane or not | s[n] = 0 if vehicle cut a solid lane | overall score can be represented as $S[n]=F(s[n], si[n])$, where $S[n]$ is the overall score, $s[n]$ is the score from another modality, i.e. context, that could have a bearing on the inertial sensor score $si[n]$, and $F(\ )$ is the function which could take any form. For example, $F(\ )$ could be multiplicative, additive and the like.

In an example embodiment, the scorer 208 also determines if the score is to be impacted positively or negatively by the context and the event. In an example embodiment, this is partly done along with the analyzer 206. Inferring from audio or visual context on whether the event was good or bad can be done manually or automatically. If it is manual, a fleet manager or a supervisor inspects the context and the event to decide whether it contributes positively or negatively to the score. If it is automatic, there are prelearnt/ predetermined/precomputed rule based on machine learning based system that decides whether the score is impacted positively or negatively given the context and the event. The extent of the impact caused by negative scoring is dependent on degree of non-compliance.

It should be noted that the various components of the server 112 also sometimes locally in the vehicle, for example, the context detector 202, the event detector 204, the analyzer 206 and the scorer 208 can be implemented using hardware, software, firmware, or a combination thereof. For instance, these components can be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Figure 3:
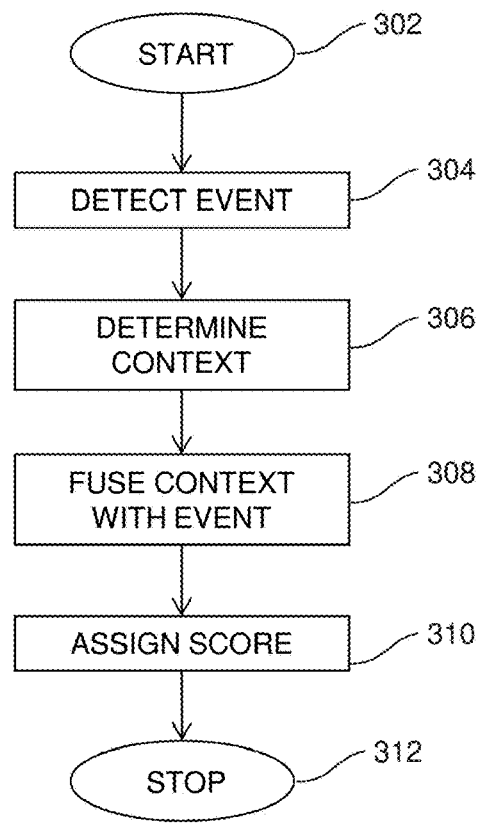
FIG. 3 is a flow chart showing a method for driver monitoring by fusing contextual data with event data to determine a context as cause of an event, in accordance with an example embodiment of the present disclosure.

FIG. 3 is a flowchart illustrating a method for driver monitoring by fusing contextual data with event data to determine context as cause of event performed by a server, for example the server 112.

The method starts at step 302 and proceeds to step 304.

At step 304, an event is detected. The sensors, for example the sensors 106, attached to a vehicle, for example the vehicle 102, sends the event data to the server. The event data includes raw data captured by the sensors or may include some processed data if processed intermediately. The event data is then processed to determine an event. The event is defined as the activity performed by a driver or experienced by the vehicle, for example the driver 104, of the vehicle. Various sensor signal interpretation algorithms can be used to determine the event. Examples of the event include, but are not limited to, hard braking, lane change, hard acceleration, cornering, distraction of the driver, and non-compliance in driving. In some example embodiments, the event is defined as an action that occurred as a result of an activity performed by the driver. Various existing techniques can be used to determine the event.

At step 306, a context is determined. The context is determined from contextual data, also known as the audio and/or the video data, received from the video or audio detectors or recorders, for example the recorders 108. The context is defined as a possible reason that could have caused the event. Examples of the context include, but are not limited to, the driver of the vehicle was driving improperly, the driver of the vehicle was driving properly but a driver of nearby vehicle applied sudden brake, there was a traffic sign in the view ahead, the driver of the vehicle spotted a traffic signal or a speed breaker sign or a stop sign or other traffic signs that are either mandatory or informative to the driver, unidentified or identifiable object on the road, object coming in unforeseen circumstances in front, the driver accelerating to avoid an accident due to an unforeseen object or circumstances, another vehicle being driven in a dangerous way on the road in the vicinity, a pedestrian on the road, the driver overtaking, the driver joining a main lane from side lane, the driver heard car honking, the driver driving in a zigzag manner, the driver cornering to avoid an accident due to an unforeseen object or circumstances, chat with a passenger, drowsiness of the driver, usage of mobile phone by the driver, any unexpected or unforeseen sounds coming from within the vehicle or outside the vehicle, and distraction of the driver. In some example embodiments, the context is defined as a reason or a cause that resulted in the event, i.e. causing driver to do the activity.

In some example embodiments, each video frame is analyzed to see if any object or event from a driving and traffic viewpoint is detected. Object detection is an important functionality of the server and the server is trained to detect objects using various techniques. It has to be appreciated that this object detection in some cases can happen partially or completely locally. One example includes collecting a large sample set of the object of interest for training purposes. Any one or more of the features such as, wavelets, scale invariant feature transform (SIFT), histogram of oriented gradients, local binary patterns, steerable filters, Gabor filters and the like is used for describing image data (frame data of a video). The features are learnt, instead of being hand crafted as in the state-of-the-art deep learning approaches. Any state of the art machine learning algorithm is used to train the server. Examples of machine learning algorithm include, but are not limited to, support vector machines, adaboost, decision trees, convolutional neural nets, recurrent neural nets and the like. A generative or a discriminative model is trained. For example, a generative model is trained using only positive samples and this is used to compute the likelihood or probability of a given image patch including, representing or containing the object of interest. An additional logic is also present to infer the presence of an object given the likelihoods. Alternately, a set of negative examples are defined, and a discriminative training is done. Examples of generative models include, but are not limited to, Gaussian Mixture Models, AutoEncoders and the like. Examples of discriminative models include, but are not limited to support vector machines, adaboost and the like. An object can be animate or inanimate, for example the object can be person, animals, a falling rock, a tree that falls and the like. In general, any object that can be visually recognized and which is not meant to be on the road, and if it appears on the road in an unforeseen circumstance is included in the object.

In some embodiments, the audio data from inside the vehicle is used for driver monitoring and building a driver's risk profile. There can be a microphone inside the vehicle cabin that monitors the speech and an audio. A machine learning algorithm can be trained to detect and classify the speech segments into one of the following categories: rude, stressed, angry, scared, panic and the like. This is used to monitor driver behaviour, especially in taxis, buses and the like, where it is important that the drivers be courteous to the passengers. Rude drivers can lead to lost business. Aggressiveness detected in the voice of a driver can also be with respect to other vehicles or people in the vicinity. Audio detected in the car, in the form of music, a video being played, a podcast etc., can also be considered context, as paying attention to the audio is detrimental from a point of view of concentrating on driving. Further, certain types of audio like rock music, etc., played at very high decibel levels can be particularly distracting for the driver.

To determine whether the voice belongs to the driver, a speaker model for drivers is generated to determine who is being rude. This could be important in a ride sharing kind of scenario where the driver gets to rate the passenger and vice versa. If there is a conflict, it is established whether the voice was that of the driver or not. An alternate way of doing the same includes using an array of microphones which can determine the direction of arrival of the sound waves. In this case, since the microphones position is fixed, it can differentiate whether the driver is speaking or someone else is, based on the direction alone. The voice can be classified as required, and the angle tells whether it belongs to the driver or others. Driver talking means driver distraction, whether on the phone or with others in the car. The amount of time the driver is speaking can be a factor to determine how safe the driver is. A certain nominal amount of speaking is needed for the driver, and that can be discounted. Anything beyond it can be penalized.

In various embodiments, the order of steps may vary. For example, step 306 can be performed before step 304 or both can be performed simultaneously. In some instances, 306 may be performed just before 304. For example, if certain events are likely or highly likely to happen in certain contexts, the context can in some cases be detected or recognized first, and the particular event/s can be detected at a later step.

At step 308, the context is fused with the event to determine context as a cause of the event. The determination is made by correlating the context with the event. A mapping table is used to establish the determination. If a mapping is not found then machine learning algorithms or manual inputs can be used to establish the relationship. Alternately, certain events can be seen as being highly probable in certain contexts, and in such an event, the context could be detected first, and the event later.

At step 310, the driver performance metric is scored based at least on the event and the context.

In some example embodiments, the method also determines if the score is to be impacted positively or negatively by the context and the event. This is partly done along with the step 308. Inferring from audio or visual context on whether the event was good or bad can be done manually or automatically. If it is manual, a fleet manager or a supervisor inspects the context and the event to decide whether it contributes positively or negatively to the score. If it is automatic, there are prelearnt/predetermined/precomputed rule based on machine learning based system that decides whether the score is impacted positively or negatively given the context and the event.

In an example embodiment, the driver performance metric is an N-dimensional metric indicating performance of driver across various parameters. These N dimensions in the scoring can characterize safety, efficiency, compliance, distraction, driving under influence, and other similar parameters that need to be tracked or influence the key performance indicators of a fleet. The scoring can be performed in various manners and few have been described in details below. For example, separate scores can be computed for the event and for the context, and then merged or correlated to obtain overall score.

In one embodiment, the score computation can be done based on heuristic rules or machine learning. Heuristic rules can be of the following form (with no loss of generality):

Instantaneous score $s[n]=f(p, m)$, where p=prescribed value, m=measured value and $f(p, m)$ is a function of p and m.

One non-limiting example for $f(p, m)=1-\exp(|p-m|/\mathrm{sigma})$ where sigma=constant. This ensures that $s[n]$ is bounded between 0 and 1. Table 1 (shown above) illustrates the event, criteria and example scoring.

In some example embodiments, subjective ratings are also simultaneously obtained from experts (driving coaches or instructors) or officials from department of motor vehicles, regional transport office and the like during the training phase. A mathematical model is built to map the events detected in the captured data to the subjective scores using learning principles. The scoring model based on subjective rating is then applied to the events detected from the captured data.

In some example embodiments, the scoring for the events is done based on the magnitude of the gravitational forces felt at that instant on the occupants or contents of the vehicle. 1 G which is 9.8 m/s2 can be taken as a reference. The gravitational forces are determined using the sensors or specific devices installed for this purpose in the vehicle. An example for computing the score for inertial sensor events could be as follows:

$$si[n]=\max(0,1-|a|/\mathrm{const}*g),$$

where $si[n]$=instantaneous score from inertial sensors, a=magnitude of acceleration (either magnitude of ax, ay and az from accelerometer, or just the relevant direction magnitude, for example ay, the horizontal direction acceleration for cornering), g=acceleration due to gravity, const=constant term, can be set to 2. This means, that if the acceleration due to vehicle motion becomes 2 g or more, the driver gets a score of 0. The constant can be set as required. For example, humans can tolerate more g-force (gravitational force) in the direction of motion than in the up-down direction. Therefore, for the z-axis (assuming that is the up-down direction), the tolerance limit in the form of the constant can be set to be lower. The score $si[n]$ is computed from inertial sensors.

The overall score is a function of the inertial sensor score, i.e. the score from the sensors and a score from another modality such as the contextual data or the video or the audio data, or the context. For instance, the overall score can be as follows:

$$S[n]=F(s[n],si[n]),$$

where $S[n]$ is the overall score, $s[n]$ is the score from another modality, i.e. context, that could have a bearing on the inertial sensor score $si[n]$, and $F(\ )$ is the function which could take any form. For example, $F(\ )$ could be multiplicative, additive and the like.

The score is then stored and available for access whenever needed. For example, a fleet manager (such as the fleet manager 116) or an operator or a supervisor may want to see performance of its drivers or the vehicles and as such may want to access the scores or a report based on the scores. The scores or the report is accessible via a user interface or service portal offered by the server.

The method stops at step 312.

Various example embodiments are configured to fuse various types of events (obtained from the event data) and contexts (obtained from the audio/video feed) to determine whether the contexts are cause of events or not. Some examples of the event and the context are now provided below.

Hard Acceleration

Various techniques can be used to detect an acceleration event, and the severity of the event from the inertial sensor data or location data. In this case, g-forces are thresholded to label an acceleration as harsh. For instance, in an example scenario, with the readings from the inertial sensors, one would only get to know that harsh acceleration occurred, without knowing the context. An example embodiment of the present disclosure considers the larger picture and figures out whether the acceleration was necessary or not. Accordingly, in an example embodiment, if an overtaking context is determined using a combination of inertial sensors and video, a moderately high acceleration can be allowed. It is noted that this limit (of moderately high acceleration) can be set as required. If the driver is joining a main road/highway/interstate from a side/smaller/ramp road, the speed limits on the former are much higher than the latter. It is necessary to accelerate upon joining the main road. This scenario can be detected by a combination of video, inertial sensors, and location data. Similarly, other context could include the driver accelerating to avoid an accident due to an unforeseen object or circumstances, or another vehicle or driver moving in an unexpected manner, causing the driver to take protective or evasive action.

Cornering

Cornering also can be detected from inertial sensors data using various techniques. The g-forces that an occupant would have experienced or the speed is a commonly used measure for determining whether cornering was done properly or harshly. Also from location data one could use the amount of turn also to assist in measuring the cornering event.

While joining a highway or a main road, there could be a turn from a side road to join. In such a case, a driver may have to accelerate while turning into the main road. This can be detected by a combination of video and location data. In such a case, there is no need to penalize the driver. Other context for cornering includes the driver cornering to avoid an accident due to an unforeseen object or circumstances.

Lane Change

Sudden lane changes can be determined with proper context by correlating horizontal acceleration and lane change detected from video data. Further, use of indicator to indicate lane switching can be checked from OBD data. If the G-forces are high or if the indicator was not switched on, or if the driver did not check the mirror (or look over the shoulder), then the driver is deemed to have not followed the rules. A score can be computed to take into account these behaviors.

Frequent lane changes or zigzagging through traffic can be determined from video data correlated with accelerometer data. A driver is considered to change lanes too frequently if there are many lane changes in a short distance or short duration of time. Or if there are many lane changes being done in comparison to other vehicles on the road. This comparison of too many lane changes with other vehicles on the road is done using video data. Other context for lane changing or swerving includes the driver heard car honking; and the driver cornering to avoid an accident due to an unforeseen object or circumstances.

Hard or Harsh Braking

From the inertial sensor data or location data, existing techniques can be used to detect a braking event and the severity of the braking event. Typically, the g-forces are thresholded to label a braking event as harsh or not. From these events, the braking event occurrence is determined but the reason for braking is not known. The reason could be that the driver had to brake to avert an unforeseen object (deer jumping on the road), thereby preventing an accident. In such a case, the driver must not be penalized. There are also scenarios where the driver would have had a chance to anticipate braking, in which case, the braking should not have been harsh and such an event should reflect negatively on the driver's profile.

When from the video data, it is determined that another driver's rash driving caused harsh braking, then the driver is not penalized. Examples of another driver's rash driving include, but are not limited to, harsh lane change by another vehicle into the driver's lane and harsh braking by the vehicle in front. Another driver's rash driving requires a sudden braking by the driver to merely avert a collision, even if the driver was maintaining braking distance. In such scenarios the driver has no prior information and hence, might have to brake suddenly. Similarly, if a driver is exiting a main road/highway/interstate road to an exit or a smaller road, the driver may have to brake harder than normal to comply with the sudden downward change in speed limit, which can be allowed.

There are scenarios where the driver has prior information that slowing down or braking may be needed, and the driver should anticipate and accordingly avoid harsh braking. This scenario can be determined by considering video data. For example, if a traffic light is detected using video data (or from location data where it was tagged), then the driver has to anticipate stopping at the light and therefore brake smoothly. A harsh braking in this scenario should be penalized.

If a speed breaker sign is detected using video data (or from location data where it was tagged), then the driver should be penalized if the braking is harsh as the driver has ample time to brake smoothly to a safe speeding. If the driver was tail gating, and a harsh braking occurs, then the driver has to be penalized, since it is important to maintain safe braking distance. If despite maintaining safe braking distance, the vehicle in front brakes harshly for some reason (such as the vehicle head braking to a halt due to an emergency, etc.), then the driver is not penalized.

If a stop sign is detected by video data (or by tagged information on maps), then the driver has to come to a full halt smoothly, otherwise, the driver is penalized. Approach speed at junctions can be monitored to ensure that the driver is at a speed such that the vehicle can come to a halt without a harsh braking if required, even if there is no stop sign. Other cause of hard or harsh braking includes object coming in unforeseen circumstances in front or a vehicle in the vicinity suddenly stopped or moved in an unexpected way.

Distraction of the Driver

Figure 4:
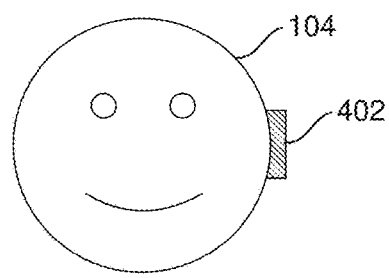
FIG. 4 illustrates a head monitoring device, in accordance with an example embodiment of the present disclosure.

Another event includes distraction of the driver and the context includes at least one of chat with a passenger, drowsiness of the driver, usage of mobile phone or other such devices by the driver, and any unexpected or unforeseen sounds coming from within the vehicle or outside the vehicle. Driver distraction and drowsiness detection is important in alerting the driver to take a break from driving. This is achieved by placing a head mounted wearable device 402 (hereinafter referred to as the device 402) shown in FIG. 4 and analysing the inertial sensor data from the device 402. FIG. 4 demonstrates a possible location of the device 402 being placed on the driver's head. FIG. 4 shows the device 402 at the location along with the hands free location wherein the inertial sensor is combined along with the ear phone of the hands free device. The inertial sensors includes in the device 402 along with their processing are described in detail later in conjunction with various flowcharts. Further, a driver is expected to look ahead at the road and concentrate on driving, and not look around too much. This behaviour can be tracked using inertial sensors. Inertial sensors show typical signatures when there is a lot of head movement (as caused by looking here and there). This is undesirable. In an example embodiment, the inertial sensors' signatures can be modelled apriori (training phase). In this example embodiment, during a drive, the inertial sensors stream is checked for excessive head movement by the driver using this pre-computed model. The excessive head movement is defined as the head movement greater than a threshold. It is understood that the threshold can be predefined. Alternately, a rule based method can be used for the same purpose exploiting the fact that the inertial sensors do not show much activity when the driver is looking ahead and has minimal head movement.

Non-Compliance in Driving

Yet another event includes detection of non-compliance in driving and the context includes distraction of the driver. Examples of compliance of driving rules include, but are not limited to, putting an indicator while turning, looking over the shoulder while changing lanes and the like. A device attached to the car is not helpful in compliance of certain rules like looking over the shoulder while changing lanes and hence, video or audio data is used to determine such context. Based at least on inferring from audio or visual context on whether an event is good or bad, the score is impacted positively or negatively.

In some embodiments, the context also includes or is based on details of the road and traffic data collected using the vehicle equipped with a multitude of sensors such as a smartphone with inertial sensors, camera and the like. Examples of such context include, but are not limited to, geo tagging of traffic lights, traffic signs, marking speed breakers, bad sections of the road (uneven, bumpy, under maintenance, and the like), vehicle statistics, i.e. density of traffic at a place, at a time of a day, and the like, type of traffic, i.e. heavy vehicles, buses, cars, and the like, flow of traffic, i.e. congested, heavy, slow, smooth, dangerous, and the like, type of neighborhood, i.e. busy, residential, isolated, and the like, and signboard detection to mark places of interest on the route, such as gas stations, service centers, banks, shopping centers, places of religious interest, educational institutions, and the like. In particular, dangerous or populated or busy or other categories of driving areas are marked out by crowd sourcing the data from vehicles. Collection of information over a long time, from many vehicles results in a huge amount of data that is processed by big data algorithms (analytics) to extract useful insights and draw meaningful context. This information can be an additional layer to existing maps like HERE™ and Google®. Use of the traffic and road information for route planning, for example if there are multiple options to go from place A to place B, then, based on some criteria, can help decide which route to take, with reasons being given why a particular route was prescribed. Cyclical or periodic insights like congestion near educational institutions (at times of opening and closing), places of religious interest (during festivals), and the like can be extracted from long term data, such as audio or video data, and used for drawing correct context.

FIG. 4 illustrates the device 402 which, in one embodiment, is mounted on the driver 104. The device 402 includes various inertial sensors for sensing data and reporting the data to the server. The device 402 can also include functionality of the recorder 108 to generate video or audio data. The server then processes the contextual and the event data to determine context and the event. The use of the device 402 in determining the context and the event is now described in conjunction with FIG. 7 and FIG. 8.

Figure 5:
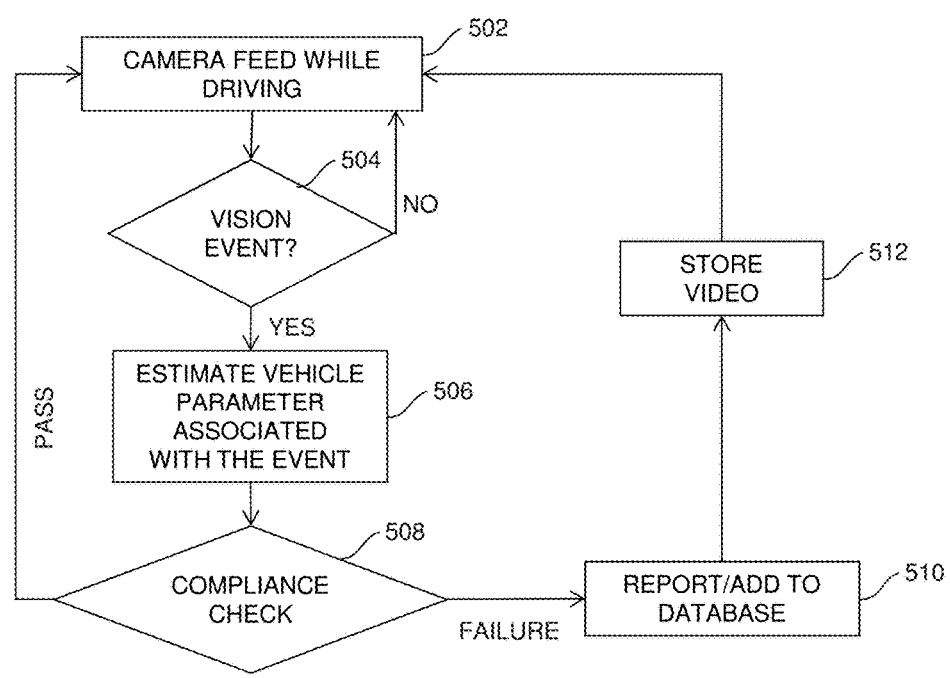
FIG. 5 illustrates a method of using video data for a compliance check, in accordance with an example embodiment of the present disclosure.

FIG. 5 illustrates a method for using audio or video data for compliance check. A method for determining the contextual data (for example, using the context detector 202 of FIG. 2 and at step 306 for FIG. 3) is illustrated in accordance with an example embodiment.

At 502, the method includes receiving the video data as camera feed streams from the camera (for example, the dashboard camera) while the driver is driving. At 504, the method includes analyzing each video frame to determine if any vision event (or object detection), from a driving and traffic viewpoint, is detected. Examples of vision events include vehicles, pedestrians, road/traffic signs, traffic lights, markers, and the like. The vision events is also referred to as context and is the cause of the event detected using inertial sensors. At 504, if any object of interest is detected, data is obtained from other sources such as the OBD sensors, inertial sensors (which could be part of the camera subsystem or connected to the camera subsystem through a Bluetooth, a USB or a wireless network), and the like. This helps in ensuring traffic laws compliance, safe driving practices compliance and the like. If nothing is detected at 504, the process of analyzing new incoming frames from the camera feed streams continues at 502. If a vision event is detected at 504, at 506 the method includes gathering data from other sources (inertial sensors, OBD etc.) or performing some computations such as estimating vehicle parameters associated with the vision event. At 508, the method includes performing a compliance check to detect if there was compliance by the driver with respect to what was detected by the camera or computer vision.

It should be noted that in block 504, vision event detection involves object detection in video frames, such as detecting vehicles, pedestrians, road/traffic signs, and the like. One example of the object detection is subsequently described. A large sample set of the object of interest is collected for training purposes. One or more of the features such as, wavelets, SIFT, histogram of oriented gradients, local binary patterns, steerable filters, Gabor filters, etc., could be used for describing the image data. The features themselves can be learnt (instead of being hand crafted) as in the state-of-the-art deep learning approaches. Any state of the art machine learning algorithm can be used to train a detector. Some examples include, but are not limited to, support vector machines, adaboost, decision trees, convolutional neural nets, and the like. A generative or a discriminative model can be trained. For example, one could train a model using only positive samples and use such data to compute likelihood or probability of a given image patch containing the object of interest. There has to be additional logic to infer the presence of an object given the likelihoods. Alternately, one could define a set of negative examples and do a discriminative training. Examples of generative models include, but are not limited to, Gaussian Mixture Models, AutoEncoders, and the like, and examples of discriminative models include, but are not limited to support vector machines, adaboost, and the like.

If, at 508, the method detects a noncompliance, then the incident is reported with all relevant details (including location and video/image data around the time of the event) and added to a database, at 510. At 512, the video data can be either stored on a local storage or uploaded to cloud. If stored in the local storage, one could upload to the cloud on a regular basis or whenever there is WiFi access, and the like.

In an example embodiment, on the cloud, big data analytics is performed on the video data thus collected. Examples of analytics include driving scores that take into account key performance indicators (KPIs) or driver performance indicators (DPIs) of interest, driving behaviour on a short term and long term, driving behaviour change, and the like. From the analytics, aberrant behaviour can be detected and the drivers can be counseled to ensure a positive behaviour change, and the like. Driver training can be imparted based on the particular non compliances to which a driver is prone to, and also based on the incident videos.

In an example embodiment, tail gating events (contextual) may be detected where vehicles in front of the vehicle being driven are detected using machine learning, as described earlier. Optionally, lanes can be detected (if lane markers are available) and only vehicles in the same lane or the immediate neighbouring lanes can be considered for analysis. Driving too close to the vehicle in front can mean that the driver is not maintaining a safe braking distance in the event that a vehicle in front stops suddenly. The video data from the dashboard camera is used to obtain samples of vehicles seen from behind, and a machine learning algorithm is used to learn the model. During driving, the model is used to detect a vehicle. The time to collision for the vehicle in front can be computed as described in some methods in the art. A tailgating offense is said to be detected when the vehicle in front is at a distance less than the safe braking distance. The severity of the offense can be computed based on how close the vehicle is to the vehicle in front. For example, if safe braking distance is 10 meters, and the distance between the two vehicles is 11 meters then no tailgating is said to occur. In another example, if the distance between the two vehicles is 9 meters then tail gating is said to occur with mild severity (1 meter over the safe braking distance). In another example, if the distance between the two vehicles is 5 meters then tailgating is said to occur with high severity. In an example embodiment, a score can be computed using the minimum braking distance and the actual distance of the car in front. In another example embodiment, a binary score can be computed wherein the score is 1 if the distance to the vehicle in front is less than the minimum braking distance, and 0 otherwise.

Tailgating events (contextual) is fused with harsh braking events (event obtained from event data). Any state-of-the-art methods can be used for detecting harsh braking events. If someone hits the brakes hard when tailgating, the driver is penalized for such harsh braking. The reason for penalty is due to the fact that such harsh braking could have been avoided if the driver was maintaining a safe distance. From the video data of the camera, the road conditions can also be monitored to calculate safe braking distance accurately. For example, on wet roads or in icy conditions, the safe braking distance is longer than in favourable road conditions.

In an example, traffic signs may be detected using a machine learning algorithm or a rule-based algorithm. In another example, speed signs may be detected. For example, once a traffic sign is detected, the speed limit maybe detected through optical character recognition (OCR). The speed limit (contextual data) is compared (fused) to the speed of the vehicle (obtained either through OBD sensors, global positioning system (GPS), and the like). If the speed is within the limit, no speeding violation is said to have occurred. If the speed is over the limit, a severity of the speeding violation is determined based on a difference between the actual speed and the speed limit. A score is computed to characterize the driver behaviour with respect to speeding. Similarly, when a stop sign is detected, it can be checked whether the vehicle came to a standstill before starting to move again. If this does not happen, and the vehicle did a rolling stop, then a stop violation is said to have occurred. In another example, if a no overtaking sign is detected, and the observed data shows that the driver performs overtaking, a binary score maybe used for penalizing the violation.

In an example, when a one way sign is detected and if a driver continues to drive in the same direction, then it is deemed that he/she is in violation of the law. A binary score can be used, when the driver breaks the law. If a school zone is detected and if a driver commits any non-compliance in a school zone, the penalty can be made more severe. Behaviour of the driver at signal lights is also detected by detecting traffic lights using computer vision. In an example, if the driver jumps a red light, a binary score of 1 indicates that a signal jump violation has occurred. One can set whether a signal jump should be noted if one moves on amber light. In another example, dangerous lane cutting is detected by checking lane type by computer vision (solid, double line solid, and the like), and the associated rules can be enforced. For example, with a solid lane crossing, lane cutting can be considered as a serious offense.

Figure 6:
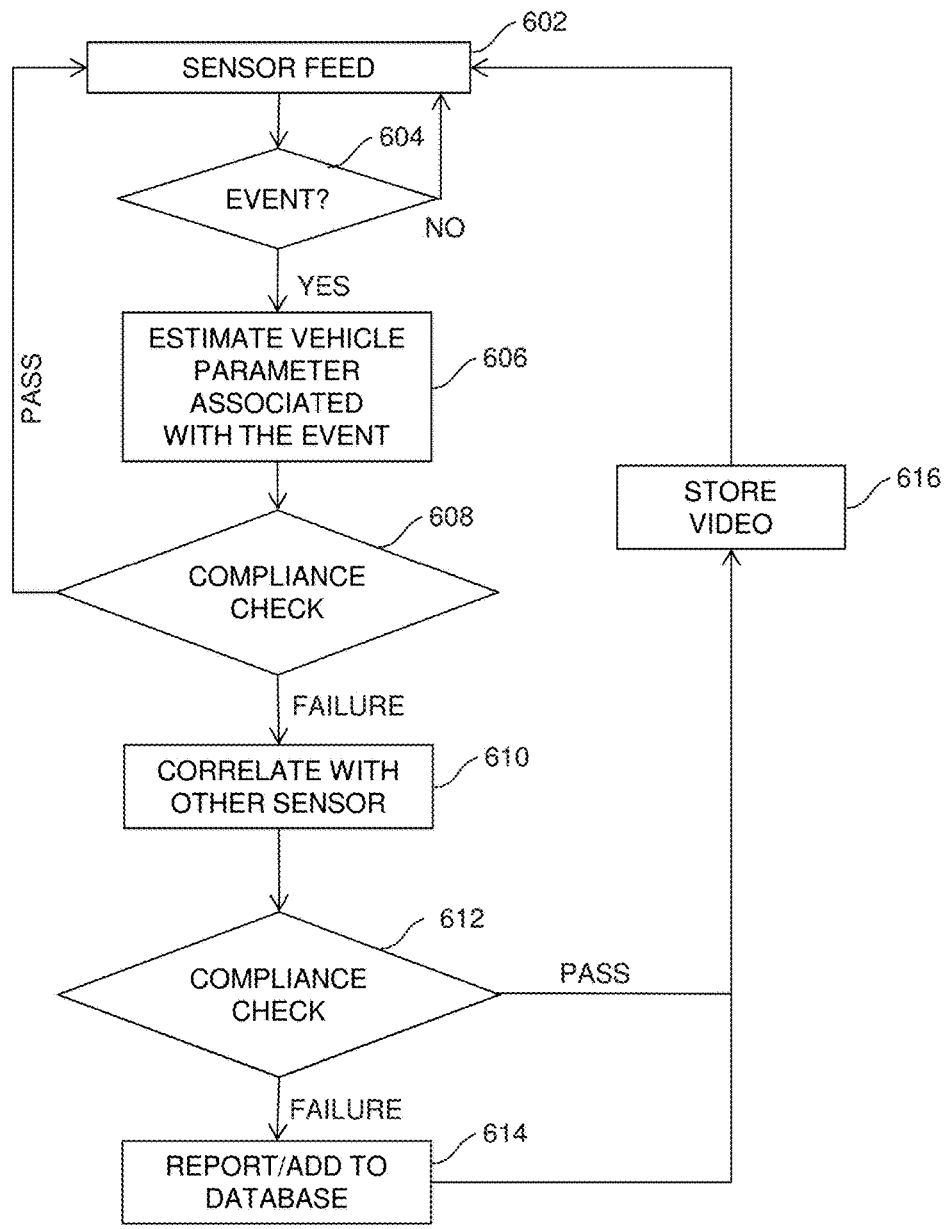
FIG. 6 illustrates a method of fusing contextual data with event data, in accordance with an example embodiment of the present disclosure.

FIG. 6 illustrates a method for fusing contextual data with event data. The method describes how contextual data is fused with event data and how the fused data is used. The fused data is obtained by using the video data in conjunction with the event data available on a vehicle from inertial sensors in sensor devices or such sensors embodied in form of smartphone sensors, GPS, camera, wearable device sensors (such as FitBit), OBD sensors and the like.

At 602, the method includes reading the multi-sensor data from various inertial or other sensors. At 604, the method includes checking if events of interest are detected from the data obtained from the sensors. If an event is detected, at 606, the vehicle parameter is obtained with respect to this event. At 608, the method includes detecting if compliance check is satisfied. At 610, the method includes correlating data from the video feed available with the event data for providing the fused data. This ensures that the confidence in the decision inferred from the event can be improved by considering multi modal contextual data (that is the data integrity improves). At 612, the method includes checking compliance with the fused data in order to make a more informed decision taking into account all the information from various sensors. If compliance check fails, the event with all relevant data are reported and stored in a database, online or offline, at 614. If the compliance check passes, it might still be of interest to record the data, at 616, (for checking later). The event video could also be stored for reference. Few examples are described earlier to highlight the importance of contextual data obtained using multi-modal data where the decision arrived at based on the event detected from any one of the sensors alone would have been either wrong or not completely right.

Figure 7:
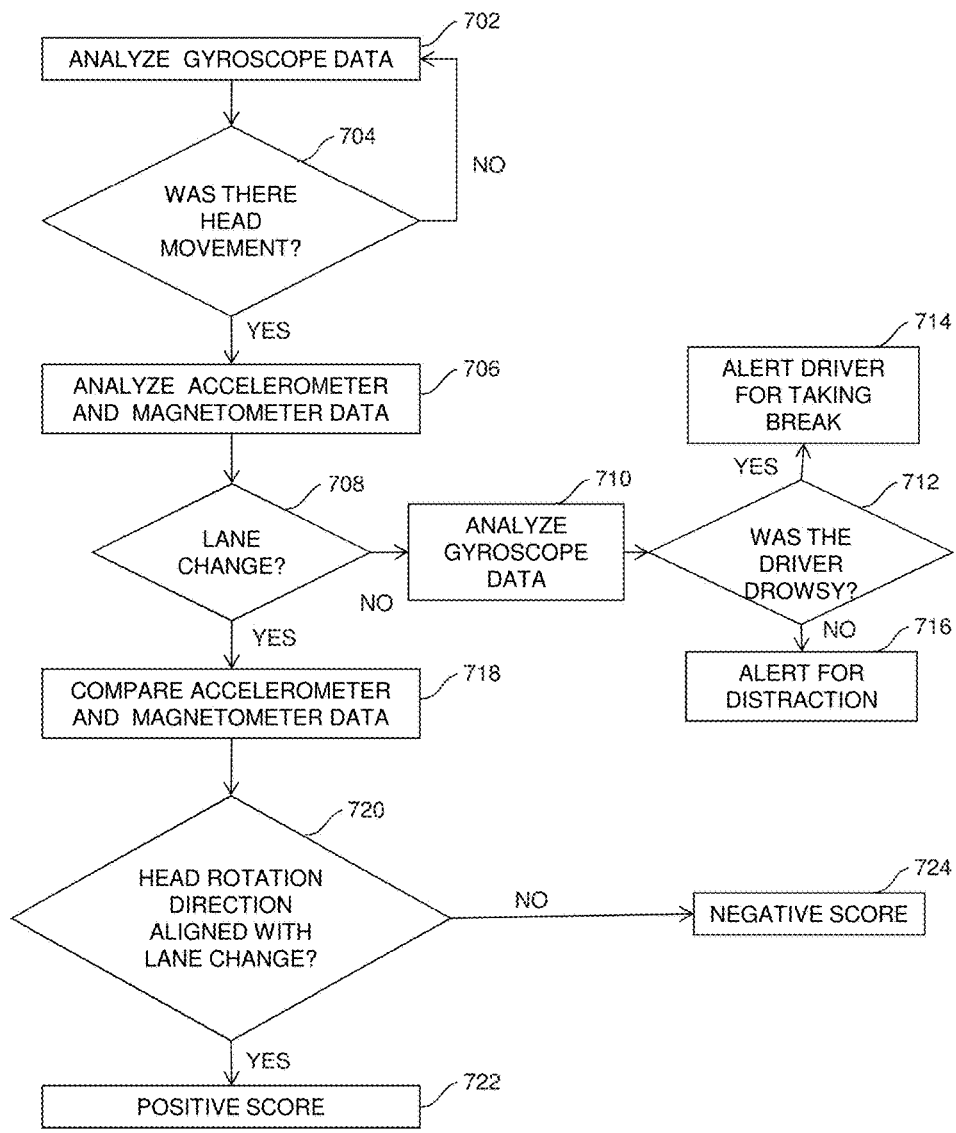
FIG. 7 illustrates a method for analyzing data from head mounting device, in accordance with an example embodiment of the present disclosure.

FIG. 7 illustrates a method for analyzing data from head mounting device, in accordance with an example embodiment of the present disclosure.

In an example embodiment, inertial sensors in the head mounted wearable sensor are continuously monitored for events. In this example embodiment, at step 702, the method includes monitoring or analyzing a gyroscope reading in the head mounted wearable sensor for new events. At 704, it is checked if an event is detected, for example if there is any head movement. If an event is detected, the accelerometer and magnetometer sensor fused data in the device mounted on the car is analyzed, at 706, to check for a possible lane change. This can be done by template matching kind of a technique where the template for lane changes are pre-stored and compared with the event data and if the matching score is greater than the pre-set threshold then it is considered as lane change. Or in an example embodiment this can also be done via training a machine using any of the machine learning methods and then tested for a possible lane change. At 708, it is checked if there was a lane change of the vehicle. If there is no lane change of the car then the fused data or the gyroscope data is analyzed at 710 and it is checked whether the driver was drowsy, at 712. This can again be done by template matching techniques or by training a machine. If, at 712, it is concluded that the driver is actually drowsy then the driver is alerted to take a break at 714, else the driver is considered to be distracted and the driver is alerted of the same at 716. If there are multiple events of the driver getting distracted then the driver is alerted to take a break at 714.

If, at 708, it is concluded that the vehicle was changing the lane, then, at 718, the fused data from accelerometer and magnetometer from the head mounted wearable and that in the device on the car are compared to identify whether they had the same direction of rotation. At 720, it is checked if the head mounted wearable sensor rotation and the lane change were in the same direction or that they are aligned. Accordingly, a positive score is given to the driver for compliance, at 722, else a negative score is given for non-compliance, at 724. It should be noted that the head rotation and the actual lane change may not happen in perfect synchrony. Typically, the head rotation is done before the actual lane and this time separation is taken into account before score assignment.

Figure 8:
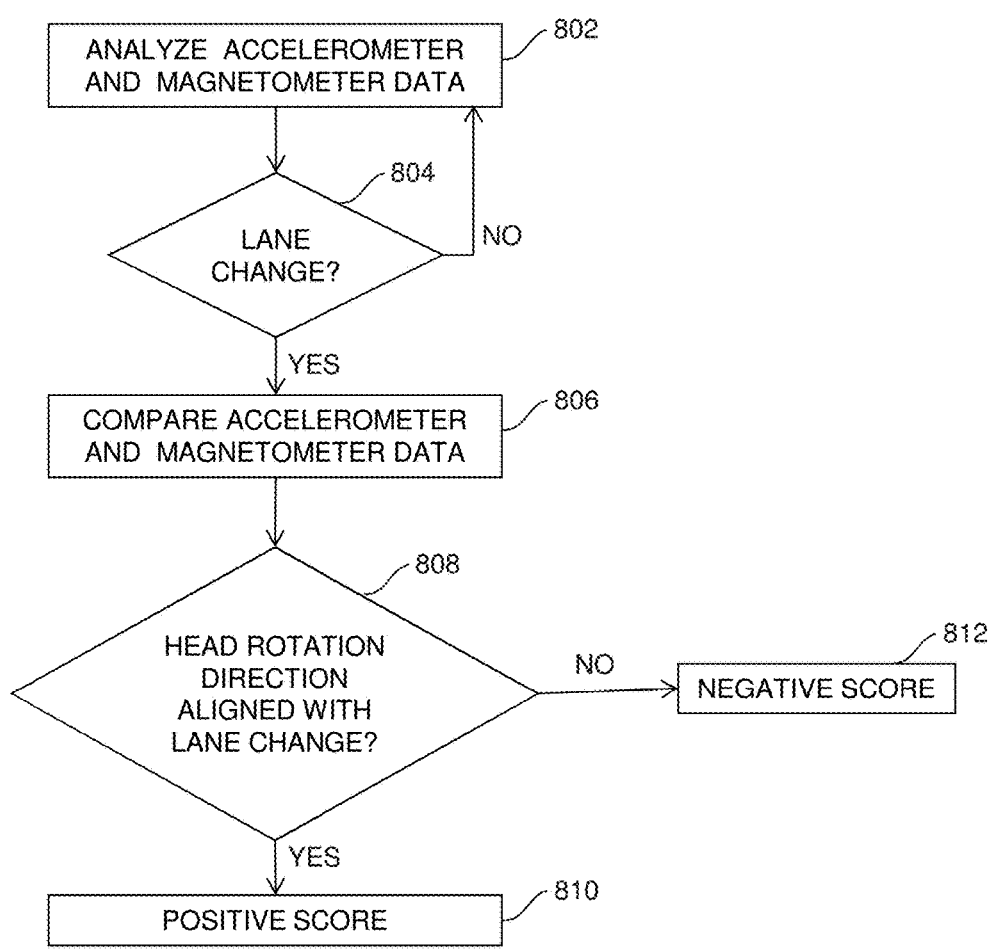
FIG. 8 illustrates a method for analyzing data from one or more sensors or devices, in accordance with an example embodiment of the present disclosure.

FIG. 8 illustrates a method for analyzing data from one or more sensors or devices, in accordance with an example embodiment of the present disclosure. In an example embodiment, inertial sensors (for example, inertial sensors present in the smartphone mounted on the device or the dashboard in the vehicle or the like) in the vehicle are continuously monitored for events. The method detects non-compliance of rules when changing lanes, where the sensor data on the vehicle is continuously monitored for lane change and then the head mounted wearable sensor data is analyzed for compliance of driving rules. At 802, the accelerometer and magnetometer sensor fused data in the device mounted on the car is analyzed to check for a possible lane change. This can be done by template matching kind of a technique where the template for lane changes are pre-stored and compared with the event data and if the matching score is greater than the pre-set threshold then it is considered as lane change. Or in an example embodiment this can also be done via training a machine using any of the machine learning methods and then tested for a possible lane change. At 804, it is checked if there is lane change of the vehicle. If there is no lane change at 804, operation at 802 is repeated else operation at 806 is performed. In case of a lane change, then, at 806, the fused data from accelerometer and magnetometer from the head mounted wearable sensor and that in the device on the car are compared to identify whether they had the same direction of rotation. At 808, it is checked if the head mounted wearable sensor rotation and the lane change were in the same direction or that they are aligned. If yes, at 810, a positive score is given to the driver for compliance, otherwise a negative score is given for non-compliance, at 812.

In some embodiments, instead of separately monitoring the inertial sensors in the head mounted wearable sensor (as explained with reference to FIG. 7) and the inertial sensors in the vehicle (as explained with reference to FIG. 8), both the inertial sensors present in the head mounted wearable sensor and the vehicle can be continuously monitored for events and compliance can be checked.

Figure 9:
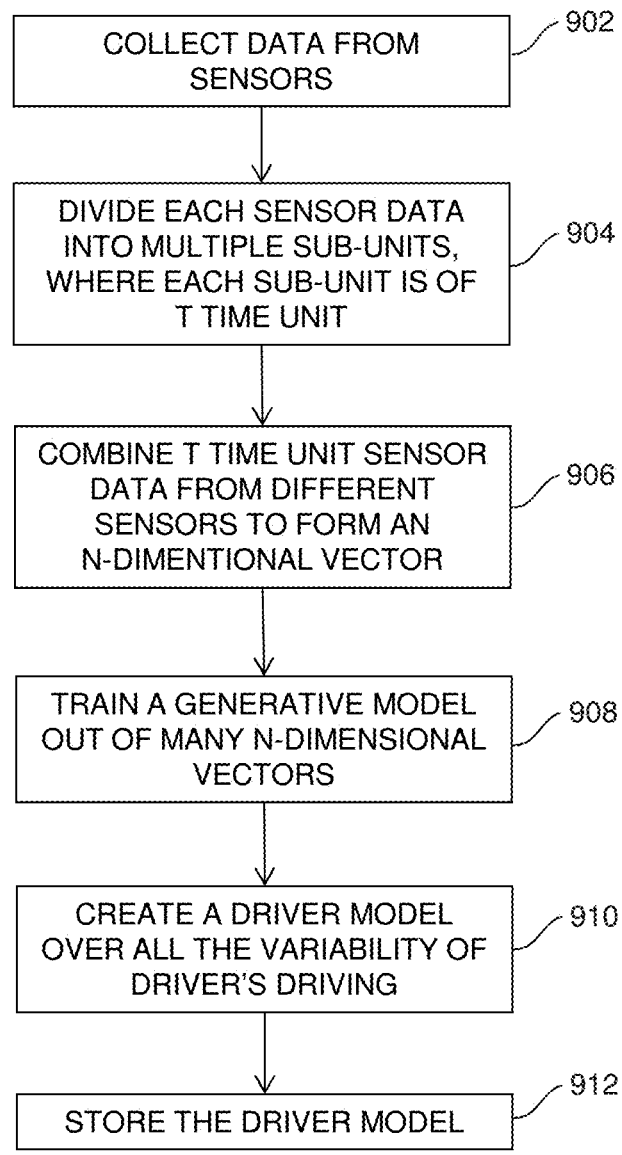
FIG. 9 illustrates a method for training a driver model, in accordance with an example embodiment of the present disclosure.

FIG. 9 illustrates an example flow diagram of a method for training a driver model in accordance with an example embodiment. In this method, driver profile generation and its usage in alerting the driver is explained. Knowing a driver profile is very important to detect any deviation from the profile, as it might indicate the driver could be under some stress, is fatigued, is driving under influence, or there could be a vehicle theft, and the like. This can also be used in identifying all the poor driving behaviour of the driver like keeping the car in idling for a long duration, accelerating too hard at the change in gear or start of the engine and the like, and helping the driver in training to change the poor driving behaviour by continuous alerts on detection of the poor driving habits. The method explains generation of a driver profile that is the training stage for driver model generation.

At 902, the method includes collecting data from different sensors like the accelerometer, gyroscope, GPS, on-board-diagnostic sensor, and the like. At 904, the method includes dividing each of the sensor data into multiple small sub-units of same length of time units (for example we can have it to be T time units where T is 1 sec or 0.5 secs etc.) with each time unit from all the sensors having a fixed number of samples within it. For example, the T time unit of accelerometer could be having Na samples, similarly for gyroscope it could be Ng samples, and the like.

At 906, the method includes combining T time unit sensor data from all or different sensors to form an N-dimensional vector. For example the combination could be just concatenation of sub-units from all the sensors to make N=Na+Ng+ . . . , or it could be reduced features from each of the sensor data being combined to make the N dimensional unit. The feature reduction could be done using any generative model like Principal Component analysis, by transforming to Fourier domain using Fourier transform, and the like. At 908, the method includes training a parametric generative model using all the N-dimensional feature vectors. The parametric generative model could be Gaussian Mixture Model or a Deep Neural Network trained via Auto-encoder, and the like. At 910, the method includes creating a driver model, and such driver model would give the driver profile being represented by model parameters being learnt over all the variability of driver's driving. At 912, the method includes storing the driver model.

Figure 10:
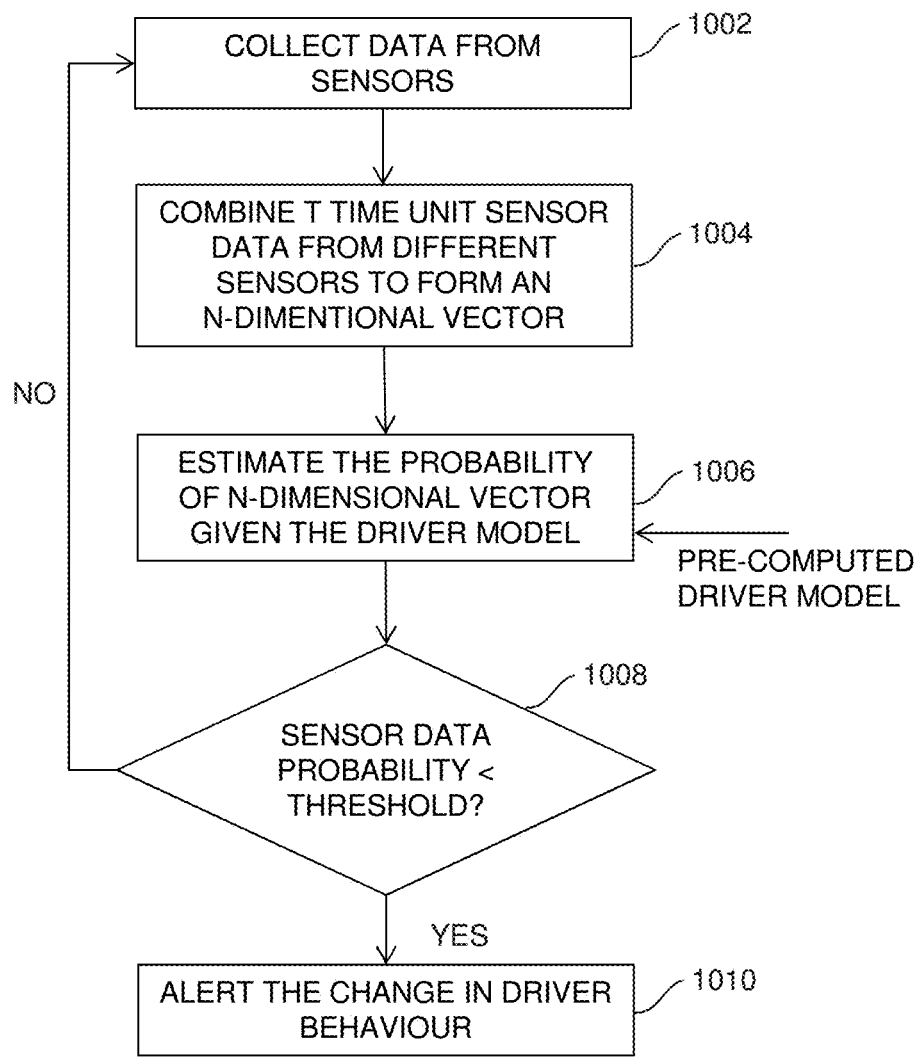
FIG. 10 illustrates a method for testing driver data given a driver model, in accordance with an example embodiment of the present disclosure.

FIG. 10 illustrates an example flow diagram of a method for testing a driver profile against a driver model in accordance with an example embodiment. At 1002, the method includes collecting the sensor data for the T time unit as is done in the training stage. At 1004, the method includes, combining T time unit sensor data from all or different sensors to form an N-dimensional vector. For example the combination could be just concatenation of sub-units from all the sensors to make N=Na+Ng+ . . . , or it could be reduced features from each of the sensor data being combined to make the N dimensional unit. The feature reduction could be done using any generative model like Principal Component analysis or by transforming to Fourier domain using Fourier transform, and the like. In an example embodiment, formation of the N dimensional vector is similar to the N dimensional vector obtained during the training of the driver model, as explained with reference to FIG. 9.

At 1006, the method includes estimating the likelihood or the probability that the current feature vector (of N dimensions) belongs to a particular driver model. At 1008, it is checked if the probability is less than a preset threshold. If yes, then at 1010 the change in driver behaviour is alerted as it is determined that the current driver doesn't belong to the driver model, else the method continues to look at the next time unit.

The driver model could also be trained with some contextual data in the background. In which case there would be multiple models for the same driver but under different contexts like congested traffic, highway/freeway, city traffic, rainy condition, and the like. Here the driver data is first classified into one of the multiple contexts like congested traffic, highway/freeway, city traffic, rainy condition, and the like based on sensor input like camera, GPS, speed of the vehicle, and the like. Then a driver model is built for each of the context. In case of inference, first the context is inferred from sensors and then a respective model is used to check whether the driver belongs to the particular profile or not.

Figure 11:
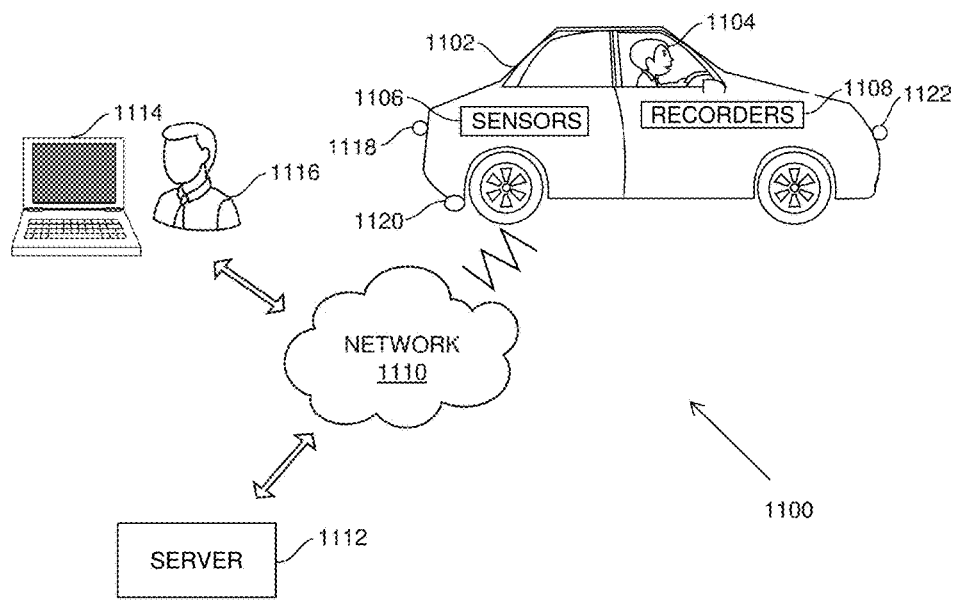
FIG. 11 illustrates another example representation of an environment, in accordance with an example embodiment of the present disclosure.

FIG. 11 shows another example representation of an environment 1100, where one or more embodiments of the present disclosure can be implemented.

The environment 1100 includes a driver 1104 driving a vehicle 1102. The vehicle 1102 is equipped with one or more sensors 1106 (hereinafter referred to as the sensors 1106) and one or more video or audio recorders 1108 (hereinafter referred to as the recorders 1108). Examples of the sensors 1106 include, but are not limited to, inertial sensors, on-board diagnostic sensors (OBD), and location data sensors. Examples of the recorders 1108 include, but are not limited to, a dashboard camera, a smartphone camera, an advance driver assistance system (ADAS) camera and the like. The sensors 1106 and the recorders 1108 are placed at or attached to various parts of the vehicle 1102 to enable capturing of data from various parts of the vehicle 1102. The vehicle 1102 also includes additional sensors 1118, 1120 and 1122 for capturing data. Additional sensors 1118, 1120 and 1122 can be of different types than the sensors 1106 or can be similar to the sensors 1106. The sensors 1118, 1120 and 1122 can be same or different and are located at various portions of the vehicle 1102 to capture data from different locations. The captured data, including compliance event data, driver event data, and vehicle event data is sent to a server 1112 via a network 1110. The driver event data is defined as data that relates to the driver 1104 and indicates change in state of the driver 1104. The vehicle event data is defined as data that relates to the vehicle 1102 and indicates change in state of the vehicle 1102. The compliance event data is defined as data that relates to compliance and indicates compliance related event. The server 1112 processes the captured data to fuse at least two of the driver event data, the vehicle event data and the compliance event data. For example, the server 1112 processes the driver event data and the vehicle event data to determine the driver event as a cause of the vehicle event. In another example, the server 1112 processes the vehicle event data and the compliance event data to determine if the vehicle event occurred in compliance or not. Similarly, the server 1112 processes any two or all three data to draw meaningful correlations and inferences. The server 1112 also assigns score to a driver performance metric based at least on the contextual data, the compliance data and the event data. The driver performance metric can be accessed by a fleet manager 1116 via a device 1114. The device 1114 is connected to the network 1110 to provide the driver performance metric to various entities, for example fleet operators, for various drivers. The driver performance metric can be provided as an online service, or as an application. Typical users of such an application or the service include entities having a fleet of drivers or vehicles.

Figure 12:
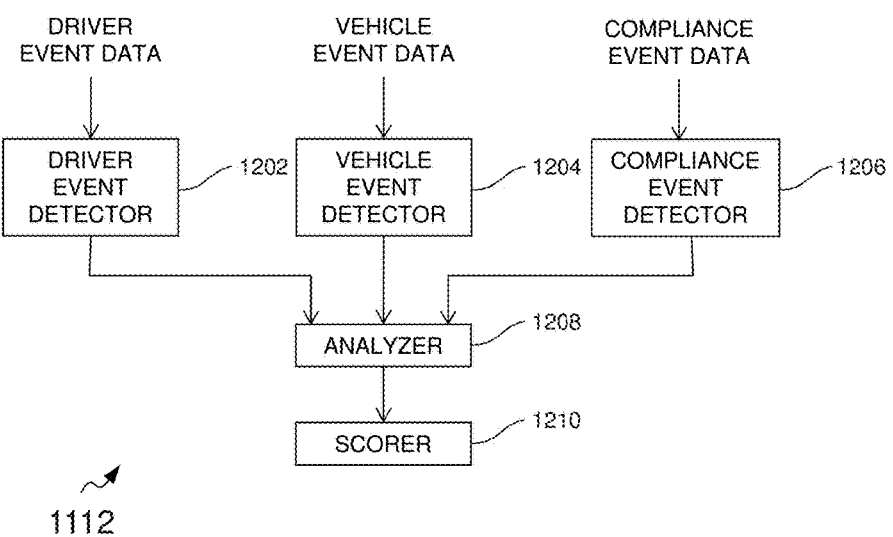
FIG. 12 illustrates a server for analyzing data from one or more sensors or devices, in accordance with an example embodiment of the present disclosure.

FIG. 12 illustrates a server, such as the server 1112, in accordance with an example embodiment of the present disclosure.

The server 1112 includes a driver event detector 1202 for detecting a driver event from driver event data. The server 1112 also includes a vehicle event detector 1204 for detecting a vehicle event from vehicle event data. Further, the server 1112 includes a compliance event detector 1206 for detecting a compliance event from compliance event data. The detectors receives data from the sensors 1106, the recorder 1108, and the additional sensors 1118, 1120, and 1122, and processes the data to detect driver event data, vehicle event data and the compliance event data.

Examples of the vehicle event include, but are not limited to, hard braking, lane change, hard acceleration, and cornering. Examples of the driver event include, but are not limited to, distraction of the driver 1104, head movement of the driver 1104, movement of any other portion of the driver 1104, or movement of the driver 1104. Examples of the compliance event include, but are not limited to, any event that relates to non-compliance, such as breaking of traffic signal, wrong lane driving and the like.

The server 1112 also includes an analyzer 1208 to fuse at least two of the driver event data, the vehicle event data, and the compliance event data. The driver event data is processed to determine a change in state of the driver 1104. The vehicle event data is processed to determine a change in state of the vehicle 1102. The compliance event data is processed to determine compliance related event. The processing can be performed using existing techniques, and various machine learning algorithms.

The analyzer 1208 then correlates at least two of the driver event data, the vehicle event data, and the compliance event data. The analyzer 1208 fuses the driver event data and the vehicle event data to determine the driver event as a cause of the vehicle event. In another example, the analyzer 1208 processes the vehicle event data and the compliance event data to determine if the vehicle event occurred in compliance or not. Similarly, the analyzer 1208 processes any two or all three data to draw meaningful correlations and inferences. As correlation progresses, a mapping is created among the events or events' data to help determine the correlation among the events or the events' data in an expedited manner in future.

Based at least on the fusing, a score is provided to driver performance metric by a scorer 1210. The driver performance metric is an N-dimensional metric indicating performance of driver across various parameters. The scoring can be performed in various manners and few have been described in details earlier. For example, separate scores can be computed for different types of events, and then merged or correlated to obtain overall score.

The scorer 1210 also determines if the score is to be impacted positively or negatively by the events. This is partly done along with the analyzer 1208. Inferring from the events on whether the event was good or bad can be done manually or automatically. If it is manual, a fleet manager or a supervisor inspects the events to decide whether they contribute positively or negatively to the score. If it is automatic, there are predetermined/precomputed rule based on machine learning based system that decides whether the score is impacted positively or negatively given the events.

Figure 13:
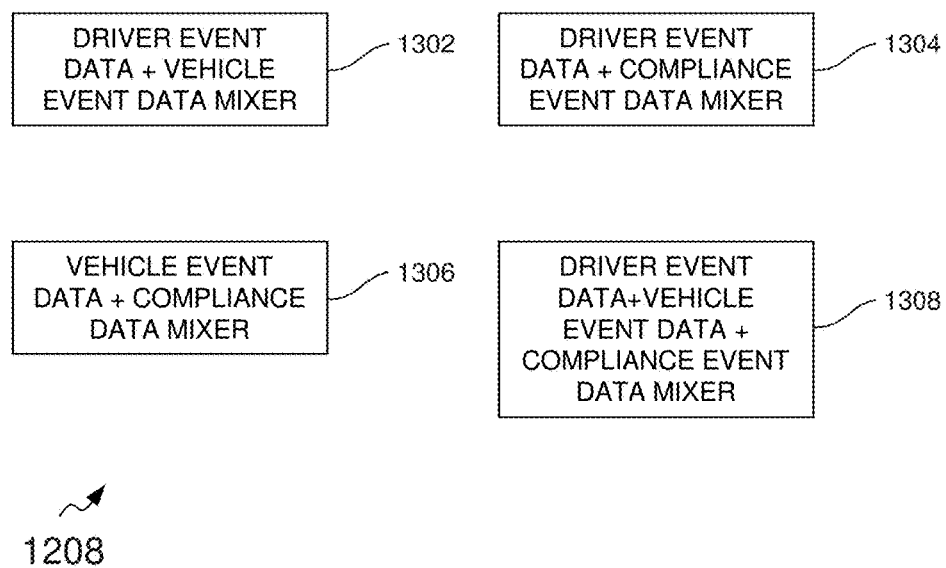
FIG. 13 illustrates an analyzer for analyzing data from one or more sensors or devices, in accordance with an example embodiment of the present disclosure.

FIG. 13 illustrates an analyzer, for example the analyzer 1208 for analyzing different events' data, in accordance with an example embodiment of the present disclosure. The analyzer 1208 includes a driver event and vehicle event data mixer 1302 for drawing correlation between the driver event and the vehicle event. The analyzer 1208 includes a driver event and compliance event data mixer 1304 for drawing correlation between the driver event and the compliance event. The analyzer 1208 includes a vehicle event and compliance event data mixer 1306 for drawing correlation between the vehicle event and the compliance event. The analyzer 1208 includes a driver event, vehicle event and compliance event data mixer 1308 for drawing correlation among the driver event, the vehicle event and the compliance event.

Figure 14:
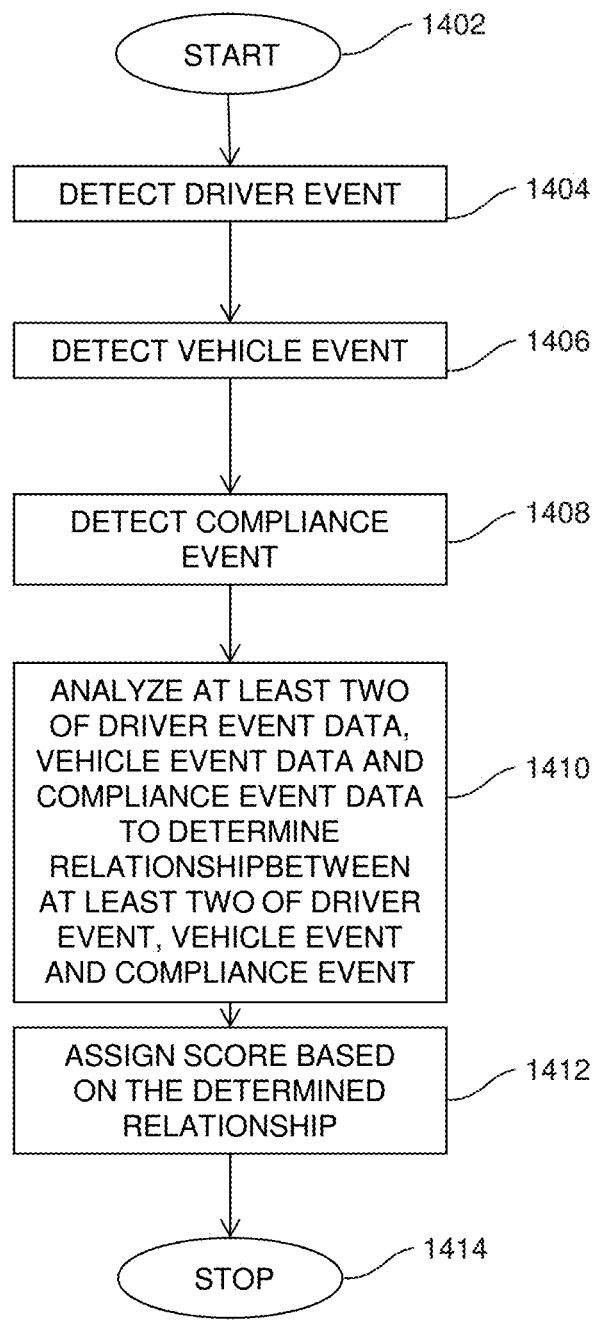
FIG. 14 illustrates a method for driver monitoring, in accordance with an example embodiment of the present disclosure.

FIG. 14 illustrates a method for driver monitoring, in accordance with an example embodiment of the present disclosure.

The method starts at step 1402.

At step 1404, a driver event is detected from driver event data.

At step 1406, a vehicle event is detected from vehicle event data.

At step 1408, a compliance event is detected from compliance event data.

It is to be appreciated that steps 1404, 1406 and 1408 can be performed simultaneously or in any order, i.e. step 1406 before step 1404 or step 1408 before step 1406 and step 1404. Also, the detection of events can be performed using machine learning algorithms or systems trained to perform such detection.

At step 1410, at least two of the driver event data, the vehicle event data, and the compliance event data is analyzed to determine relationship between at least two of the driver event, the vehicle event and the compliance event.

At step 1412, the score is assigned to driver performance metric based on the relationships established at step 1410. The method stops at 1414.

Figure 15:
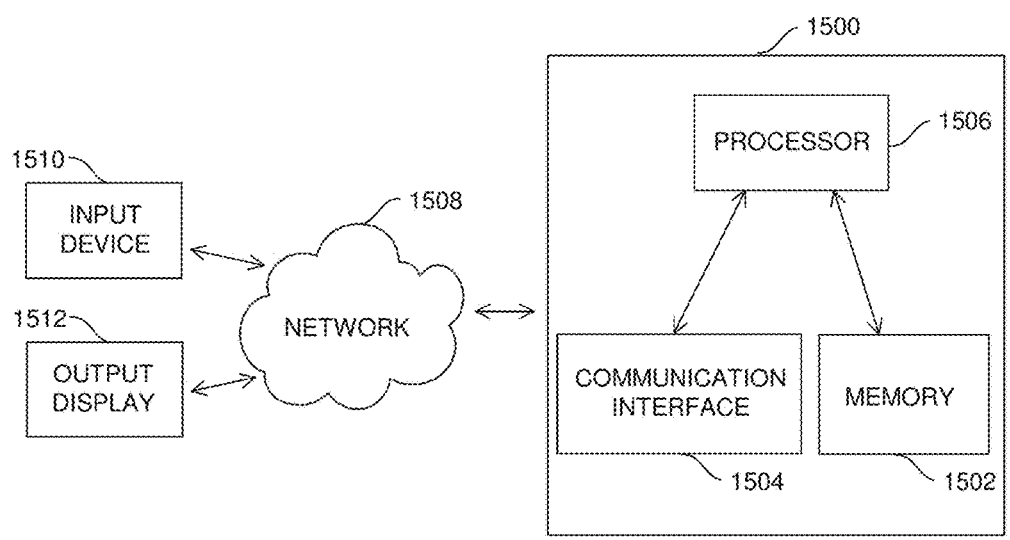
FIG. 15 is a block diagram of a server using which various embodiments described herein can be achieved.

FIG. 15 illustrates a block diagram that illustrates a server 1500, in accordance with an example embodiment of the present disclosure. Examples of the server 1500 include the server 112 and/or the server 1112. In an example embodiment, the server 1500 includes a memory 1502, a communication interface 1504 and at least one processor 1506 for processing information.

The memory 1502 is a storage device embodied as one or more volatile memory devices, one or more non-volatile memory devices, and/or a combination of one or more volatile memory devices and non-volatile memory devices, for storing micro-contents information and instructions. The memory 1502 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The communication interface 1504 may enable the server 1500 to communicate with one or more users through the network 1508 (such as the network 110 explained in FIG. 1).

Optionally, the server 1500 is also shown to take an input from an input device 1510 directly coupled to the server 1500 or via the network 1508. The server 1500 is also linked to an output display 1512, such as but not limited to a cathode ray tube (CRT), a LCD screen, a mobile device screen and a laptop screen for displaying information to the user. The communication interface 1504 is capable of communicating with the network 1508, example of which may include but are not limited to, wired, wireless cell phone networks, Wi-Fi networks, terrestrial microwave network, or any form of Internet. While only one input device 1510 and one output display 1512 is depicted in FIG. 15 for illustrative purposes, and it would be apparent that any number of input devices and output devices can be coupled with the server 1500 through the network 1508.

The processor 1506 is communicably coupled with the memory 1502 and the communication interface 1504. The processor 1506 is capable of executing the stored machine executable instructions in the memory 1502 or within the processor 1506 or any storage location accessible to the processor 1506. The processor 1506 may be embodied in a number of different ways. In an example embodiment, the processor 1506 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The processor 1506 performs various functionalities of the server 1500 as described herein.

It will be appreciated that many functionalities of the server can be performed by devices in the vehicle. For example, entire or partial analysis of data can be performed by devices present in the vehicle. Also, based on extent of analysis performed at the vehicle, the data transmitted to the server may vary. Only score may be transmitted to the server in case the analysis and scoring is done at the vehicle. Any variation it terms of functionalities performed at either the vehicle or the server is within scope of this description.

Various example embodiments disclosed herein provide numerous advantages. The systems and methods disclosed herein enable improvement of driver monitoring based on contextual data and multi-sensor data. Key performance indicators for driving behavior such as safety, comfort and fuel economy using contextual information and multi-sensory data are derived. The integrity of the data used for driver monitoring is improved through the joint use of contextual data and multi-sensor data. The quality of input data is related to gaining better insights into driver behavior/characterization in terms of risk profile, rash driving, tailgating and the like. Further, deriving ancillary information that will enrich map data such as, traffic flow at a given time, type of traffic, pedestrian density, road conditions, enables use of a plethora of applications such as, choosing a route among multiple routes smartly, and the like. Moreover, techniques disclosed herein suggest determination of driver distraction, drowsiness detection and detection of non-compliance in driving rules using a head mounted wearable sensor. Some embodiments of the disclosure enable the estimation of driver profile and use the driver profile for alerting the driver or transport manager from any bad/deviant behavior during the driving.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 15. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

We claim:

1. A method for driver monitoring, the method comprising:
    detecting an event from event data received from one or more inertial sensors associated with a vehicle of a driver or with the driver, wherein detecting the event comprises calculating an inertial sensor score $si[n]$;
    determining a context automatically in real time from an audio or video feed only received from one or more devices associated with the vehicle or the driver, wherein the context is determined locally in the vehicle without using a server remotely located to the vehicle and determining the context comprises calculating a score $s[n]$ from the context;
    fusing the event with the context to determine the context as a cause of the event automatically in real time and locally in the vehicle without using the server remotely located to the vehicle; and
    assigning a score $S[n]$ to a driver performance metric based at least on the context and the event, wherein $S[n]=F(s[n], si[n])$ with $F(\ )$ being a function of at least one of multiplication, addition, subtraction, or division, and $S[n]$ being impacted positively or negatively based on the context and the event.

2. The method as claimed in claim 1, wherein the event comprises harsh braking and the context determined using the audio or video feed comprises at least one of:
    the driver of the vehicle was driving properly but a driver of a nearby vehicle applied sudden brake or a vehicle in the vicinity suddenly stopped or moved in an unexpected way;
    object coming in unforeseen circumstances in front, wherein the object can be visually recognized and is not meant to be on the road.

3. The method as claimed in claim 1, wherein the event comprises hard acceleration and the context determined using the audio or video feed comprises at least one of:
    the driver accelerating to avoid an accident due to an unforeseen object or circumstances, wherein the object can be visually recognized and is not meant to be on the road; and
    the driver overtaking.

4. The method as claimed in claim 1, wherein the event comprises hard acceleration and the context determined using the audio or video feed comprises:
    another vehicle or driver moving in an unexpected manner, causing the driver to take protective or evasive action.

5. The method as claimed in claim 1, wherein the event comprises lane change and the context determined using the audio or video feed comprises at least one of:
    the driver heard a vehicle honking; and
    the driver swerving or cornering to avoid an accident due to an unforeseen object or circumstances, wherein the object can be visually recognized and is not meant to be on the road.

6. The method as claimed in claim 1, wherein the event comprises distraction of the driver and the context comprises at least one of:
    chat with a passenger;
    drowsiness of the driver;
    driver showing head movement greater than a threshold;
    usage of a mobile phone by the driver; and
    any unexpected or unforeseen sounds coming from within the vehicle or outside the vehicle.

7. The method as claimed in claim 1, wherein the event comprises detection of non-compliance in driving and the context comprises distraction of the driver.

8. The method as claimed in claim 7, wherein the one or more inertial sensors include at least one head mounting device configured to be worn by the driver.

9. The method as claimed in claim 1, wherein
    $si[n]=\max(0, 1-|a|/\text{const}*g)$, where $a$=magnitude of acceleration, $g$=acceleration due to gravity, and const=constant term; and
    $s[n]=f(p, m)$, where $n$=time instant, $p$=prescribed value, $m$=measured value and $f(p, m)$ is a function of $p$ and $m$.

10. The method as claimed in claim 1 and further comprising:
    inferring driving environment from the audio or video feed or the event data; and
    updating maps data based at least on the inferring.

11. The method as claimed in claim 1 and further comprising:
    estimating a driver profile using the event data and the audio or video feed; and
    alerting the driver based at least on the estimation.

12. The method as claimed in claim 11, wherein estimating the driver profile comprises:
    dividing the event data or the audio or video feed into T time sub-units and each sub-unit being represented by d dimensional feature vectors that characterize driving behaviour within that sub-unit;
concatenating the feature vectors from the T time sub-units to form an N-dimensional driver profile obtained by using a statistical or a neural network based modelling technique; and
wherein alerting comprises, alerting the driver when there is a deviation from the driver profile during a drive, the deviation being detected based on evaluating a feature vector obtained during the drive against the driver profile and estimating the likelihood or the probability that the feature vector belongs to the driver profile.

13. The method as claimed in claim 9, wherein assigning the score comprises:
assigning the score positively or negatively.

14. The method as claimed in claim 13, wherein assigning the score comprises:
checking a predetermined rule based at least on a machine learning system that decides whether the score is impacted positively or negatively given the context and the event, wherein extent of the impact caused by negative scoring is dependent on degree of non-compliance.

15. A system for driver monitoring, the system comprising:
an event detector for detecting, automatically in real time and locally in a vehicle without using a server remotely located to the vehicle, an event from event data received from one or more inertial sensors associated with the vehicle of a driver or with the driver, wherein the one or more inertial sensors comprise at least one head mounting device configured to be worn by the driver, wherein detecting the event comprises calculating an inertial sensor score si[n];
a context detector for determining, automatically in real time and locally in the vehicle without using the server remotely located to the vehicle, a context from an audio or video feed only received from one or more devices associated with the vehicle or the driver, wherein determining the context comprises calculating a score s[n] from the context;
an analyser for fusing, automatically in real time and locally in the vehicle without using the server remotely located to the vehicle, the event with the context to determine the context as a cause of the event; and
a scorer for assigning, automatically in real time and locally in the vehicle without using the server remotely located to the vehicle, a score S[n] to a driver performance metric based at least on the context and the event, wherein S[n]=F(s[n], si[n]) with F( ) being a function of at least one of multiplication, addition, subtraction, or division, and S[n] being impacted positively or negatively based on the context and the event.

16. A method for driver monitoring, the method comprising:
detecting a vehicle event, automatically in real time and locally in a vehicle without using a server remotely located to the vehicle, from vehicle event data, wherein the vehicle event indicates a change in state of the vehicle;
detecting a driver event, automatically in real time and locally in the vehicle without using the server remotely located to the vehicle, from driver event data, wherein the driver event indicates a change in state of a driver and is determined from an audio or video feed only;
detecting a compliance event, automatically in real time and locally in the vehicle without using the server remotely located to the vehicle, from compliance event data, wherein the compliance event indicates an event related to compliance;
analyzing automatically in real time and locally in the vehicle without using the server remotely located to the vehicle, the vehicle event data, the driver event data, and the compliance event data to determine relationship between the vehicle event data, the driver event data, and the compliance event data; and
assigning automatically in real time and locally in the vehicle without using the server remotely located to the vehicle, a score to a driver profile based at least on the determined relationship.

17. The method as claimed in claim 16, where in the vehicle event data, the driver event data, and the compliance event data are detected using one or more inertial sensors attached to the vehicle or the driver, wherein the one or more inertial sensors comprise at least one head mounting device configured to be worn by the driver.

18. The method as claimed in claim 16 and further comprising:
estimating the driver profile using at least two of the vehicle event data, the driver event data and the compliance event data; and
alerting the driver based at least on estimating.

19. The method as claimed in claim 16 and further comprising:
inferring driving environment from at least two of the vehicle event data, the driver event data and the compliance event data; and
updating maps data based at least on the inferring.

20. The method as claimed in claim 16, wherein each event data is obtained from one or more sensors or devices attached to the vehicle or the driver.

* * * * *